June 29, 1965  P. M. McKENNA  3,191,700
ATTACHMENT OF CARBIDE HARD ALLOYS TO STEEL TOOLS
Filed April 9, 1963

INVENTOR.
PHILIP M. McKENNA
BY
Brown, Critchlow, Flick & Peckham
ATTORNEYS.

3,191,700
ATTACHMENT OF CARBIDE HARD ALLOYS
TO STEEL TOOLS
Philip M. McKenna, Greensburg, Pa., assignor to Kennametal Inc., Latrobe, Pa., a corporation of Pennsylvania
Filed Apr. 9, 1963, Ser. No. 271,635
4 Claims. (Cl. 175—410)

This invention relates to the brazing of carbide hard alloys, such as cemented tungsten carbide, to steel tools and more particularly to percussion rock drills.

Percussion tools for rock drilling have long been used with cutting tips of carbide, which are brazed to the end of a drill steel shank. In one form of such tool, the shank is upset to form a flat rectangular end face, to which is brazed a cemented tungsten carbide tip of substantially the same length as, but somethat narrower than, the end face. In some cases, the end face of the shank may be provided with a shallow slot extending its full length, and the carbide tip is received within this slot. In either case, an elongated flat rectangular surface forming the bottom of the carbide tip directly overlies and is supported by a complementary surface on the end face of the steel shank to which the tip is brazed. During the brazing operation, each of those faces expands as it is heated and then shrinks as it cools, the face of the steel shank expanding and shrinking more than twice as much as the corresponding face of the bit. (The coefficient of thermal expansion of cemented tungsten carbide is about $3.5 \times 10^{-6}$, while that of steel is about $8.3 \times 10^{-6}$.) Because such differential shrinkage occurs after the carbide tip has already been bonded to the steel shank, the bottom portion of the tip is subjected to compressive stresses that are greatest, in the absolute sense, in a direction lengthwise of the two elongated faces, and these stresses tend to cause the tip to bow upwards longitudinally, i.e. to subject the upper portions of the tip to longitudinal tensile strains that may cause, or contribute to, its failure.

It is, accordingly, among the purposes of this invention to minimize such differential longitudinal shrinkage between a steel tool and carbide tip, thereby relieving the tip of most of the damaging strains previously incident to brazing it to the steel tool.

Other objects will be apparent from the following description of a preferred embodiment of the invention, in connection with the accompanying drawings, in which FIG. 1 is a front elevation of the working end of a percussion drill having a carbide tip attached in accordance with this invention;

The present invention is predicated on the discovery that a carbide hard alloy cutting member can be brazed to a steel tool member, so as to minimize differential thermal expansion strains between the two members, by providing on the face of the steel member that supports the carbide member a composite surface having reduced shrinkage in the desired direction. Such a surface can be obtained, for example, by forming one or more recesses along the length of the supporting face of the steel member, the recesses extending substantially normal to the face, and brazing in each recess an alloy insert having substantially the same coefficient of thermal expansion as the carbide member but having a greater elastic limit than the carbide member. When the carbide tip is brazed to such a composite supporting face on the steel member, the total shrinkage along the length of the supporting face will be the sum of the linear shrinkages of the inserts and the steel between and beyond those inserts, and will be much less than if that surface were composed of steel alone. Such a construction also has other advantages that will be referred to later herein.

Figure 3:
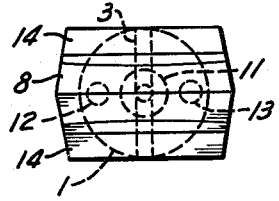
FIG. 3 is a plan view of the drill of FIG. 1.
Figure 2:
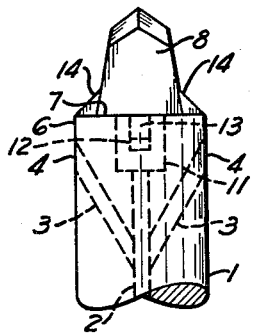
FIG. 2 is a side elevation of the upper portion of the drill of FIG. 1.
Figure 1:
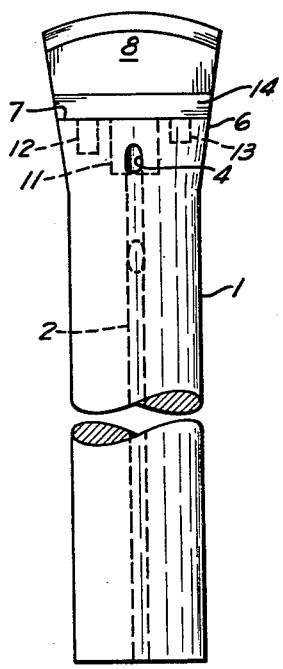

Referring to FIGS. 1–3, the steel shank 1 of a percussion rock drill is provided with the usual central bore 2, lateral branch bores 3, and ports 4, through which may be forced a suitable drilling fluid. The end 6 of the drill shank has been upset to form a rectangular, substantially flat face 7, to which is brazed a cemented tungsten carbide cutting tip or blade 8. As is usual in tools of this type, the tip has a flat bottom face in the form of an elongated rectangle. Directly underlying the tip and supporting it in part are one or more, in this case three, cylindrical plugs or inserts 11, 12, and 13 of an alloy having substantially the same coefficient of expansion as, but a greater elastic limit than, the tip. A suitable alloy having these characteristics is one that contains a high proportion of tungsten and is substantially free of carbon, for example, an alloy consisting of about 90% tungsten, 6% nickel, and 4% copper. This particular alloy has a coefficient of thermal expansion that is very close to that of cemented tungsten carbide, but has a considerably higher elastic limit. These inserts are arranged symmetrically relative to the bottom surface of the tip directly overlying them and extend along the long axis of the tip. Each insert has a preferably circular cross-section, that in the center having a larger diameter and being longer than those on either side, which are of the same diameter but preferably of different length. The inserts rest on the flat bottoms of holes bored in the drill shank, except for the center insert, which rests on the bottom of a counterbore in bore hole 2. By making the inserts of different length, so that they extend to unequal depths, as shown, their bottomed support for the carbide tip is not concentrated in any one plane normal to the axis of the drill.

After the end face of the tool shank has been bored and counterbored for receiving the inserts and the carbide tip, the parts of the assembly, including tapered side wall strips 14, which are preferably of the same alloy as the inserts, are cleaned, assembled, and silver soldered together, using suitable jigs of graphite to position the parts and permit the application of gentle pressure thereto during the brazing operation.

Following the brazing operation described above, the differential linear shrinkage between the carbide tip and the composite end face of the drill steel shank will, for the reasons stated above, be much less than if the inserts were not present. By proper choice of the number of inserts and their size and spacing, it is possible to reduce this differential linear shrinkage to a minimum without sacrificing other desirable characteristics of a drill steel tool.

Figure 5:
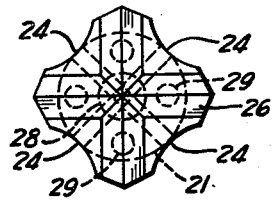
FIG. 5 is a plan view of the drill of FIG. 4.
Figure 4:
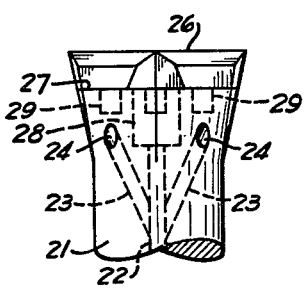
FIG. 4 is an elevation of a modified form of drill having a cruciform cutting tip.

In FIGS. 4 and 5 is shown a cruciform type of rock drill, in which the steel shank 21 is provided with drilling liquid passages 22 and 23 and liquid outlet ports 24. The cemented carbide tip 26, of cruciform design, is mounted on the end face 27, the cross-axial bearing portions of which are interrupted by a central insert 28 and lateral inserts 29 of the same alloy material described in connection with FIGS. 1–3. Here, too, the linear differential shrinkage along the cross-axes of the tip-shank interface are much less than if the end face of the drill shank were all steel.

Other advantages of the present invention include the added resiliency of the joints of silver solder brazing material around the alloy inserts. These joints can give a little, thereby increasing the overall elastic limit of the shank end face. Moreover, the silver solder accommodates itself during the brazing operation to draw the inserts to a level surface against the film of silver solder under the carbide tip. In addition, the inserts act as a hard and a strong foundation, giving support to the tip under percussive loads; and, as previously indicated, such support can be based on two or more different levels axially of the drill, rather than concentrated in any one plane normal to the drill axis.

While the invention has been described herein with respect to percussive rock drills, it will be understood that it is equally applicable to other structures that involve the attachment of carbide to steel under conditions where their unequal coefficients of thermal expansion have heretofore resulted in undesirable differential expansion and contraction.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A carbide hard alloy faced tool, comprising a steel shank with an end face, a recess formed in that face, an alloy insert mounted in the recess, a cemented tungsten carbide cutting element brazed to said face and supported in part by said insert, the insert being formed from a high tungsten alloy consisting by weight of about 90% tungsten and 6% nickel and 4% copper and having substantially the same coefficient of thermal expansion as the carbide cutting element but having a greater elastic limit than the carbide cutting element.

2. An article according to claim 1, in which there is a plurality of recesses in said face with an insert mounted in each recess, said recesses being symmetrically disposed relative to the carbide cutting element.

3. An article according to claim 1, in which the recesses are of different depths and each recess is substantially filled by an insert.

4. An article according to claim 1, in which there are three recesses in the face of the tool shank, including a central cylindrical recess and two longitudinally adjacent cylindrical recesses of smaller diameter.

References Cited by the Examiner

UNITED STATES PATENTS

| | | | |
|---|---|---|---|
| 1,428,415 | 9/22 | Brossoit | 175—410 |
| 1,969,040 | 8/34 | Sanderson | 175—410 |
| 2,673,716 | 3/54 | Auery | 175—410 |
| 2,777,672 | 1/57 | Haglund et al. | 175—411 |

BENJAMIN HERSH, *Primary Examiner.*